United States Patent

[11] 3,580,660

| [72] | Inventor | Joseph La Russa<br>Crestwood, N.Y. |
| --- | --- | --- |
| [21] | Appl. No. | 544,866 |
| [22] | Filed | Apr. 25, 1966 |
| [45] | Patented | May 25, 1971 |
| [73] | Assignee | Farrand Optical Co., Inc.<br>New York, N.Y. |

[54] IMAGE-FORMING APPARATUS
7 Claims, 7 Drawing Figs.

[52] U.S. Cl. .................................................... 353/122,
353/82, 353/94, 353/99
[51] Int. Cl. ............................................... G03b 21/08
[50] Field of Search........................................... 35/12;
353/122, 11—13, 69, 70, 82, 94, 99

[56] References Cited
UNITED STATES PATENTS

| 3,134,295 | 5/1964 | Brown et al.................. | 353/12 |
| --- | --- | --- | --- |
| 3,175,461 | 3/1965 | Brownscombe.............. | 353/95X |
| 3,234,665 | 2/1966 | Sear et al...................... | 35/12X |
| 2,021,507 | 11/1935 | Hanks .......................... | 353/49 |
| 2,938,279 | 5/1960 | Hemstreet et al............. | 353/11X |
| 3,208,341 | 9/1965 | Hosterman et al............ | 353/7X |

FOREIGN PATENTS

| 15,729 | 1906 | Great Britain................. | 353/70 |
| --- | --- | --- | --- |

*Primary Examiner*—Harry N. Haroian
*Attorney*—Pennie, Edmonds, Morton, Taylor and Adams ABSTRACT: An object plane, the plane passing through the optical center of a lens and perpendicular to its axis, and the plane of an image-receiving means intersect in a common line to produce in the image plane a distorted image of an object in the object plane. A relay lens translates the image in the image plane to the focal plane of an infinity sight to present at infinity an image of the object in the object plane. A vari-focal lens produces at the object plane as an object an image at variable magnification of an initial object such as a slide or film strip.

INVENTOR
Joseph La Russa

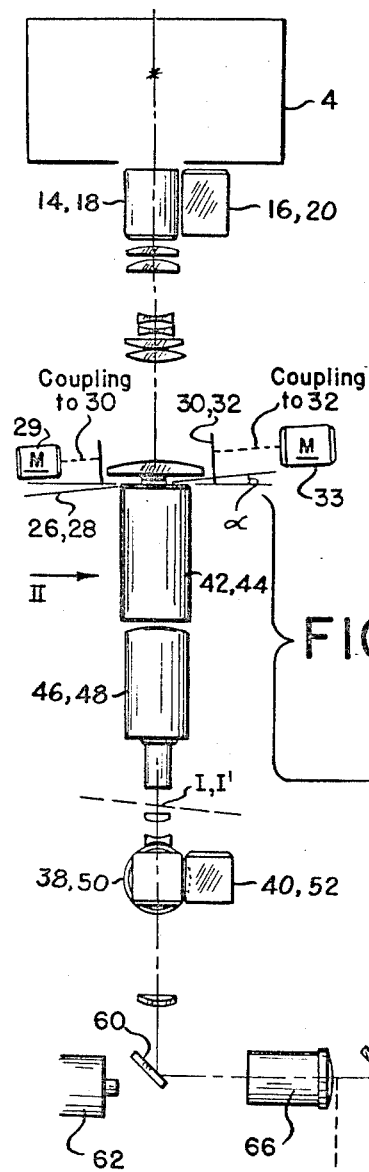
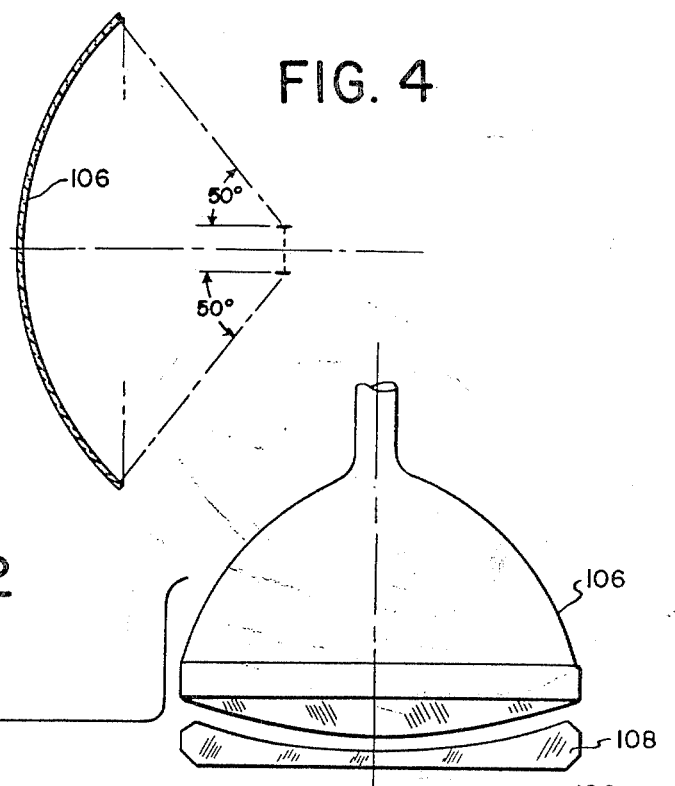
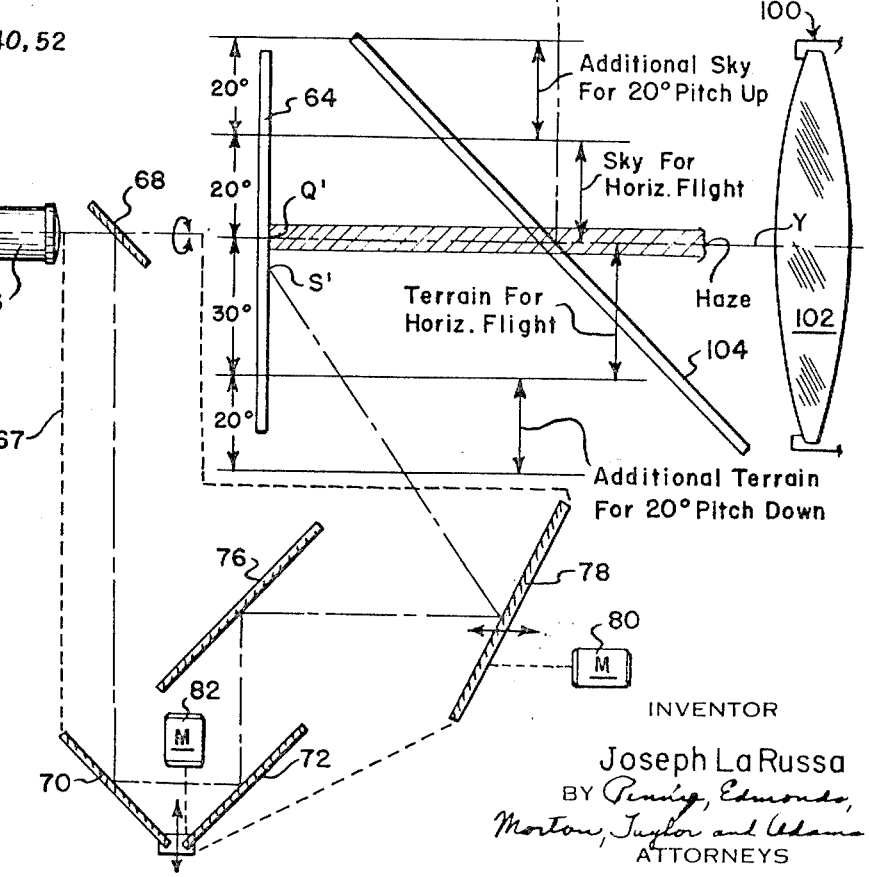
INVENTOR
Joseph La Russa

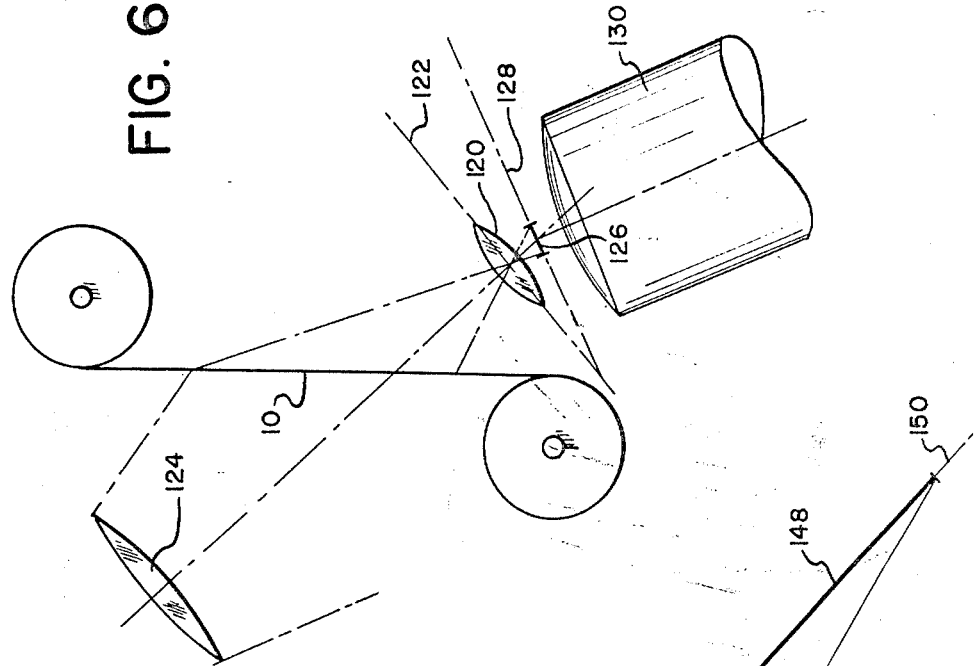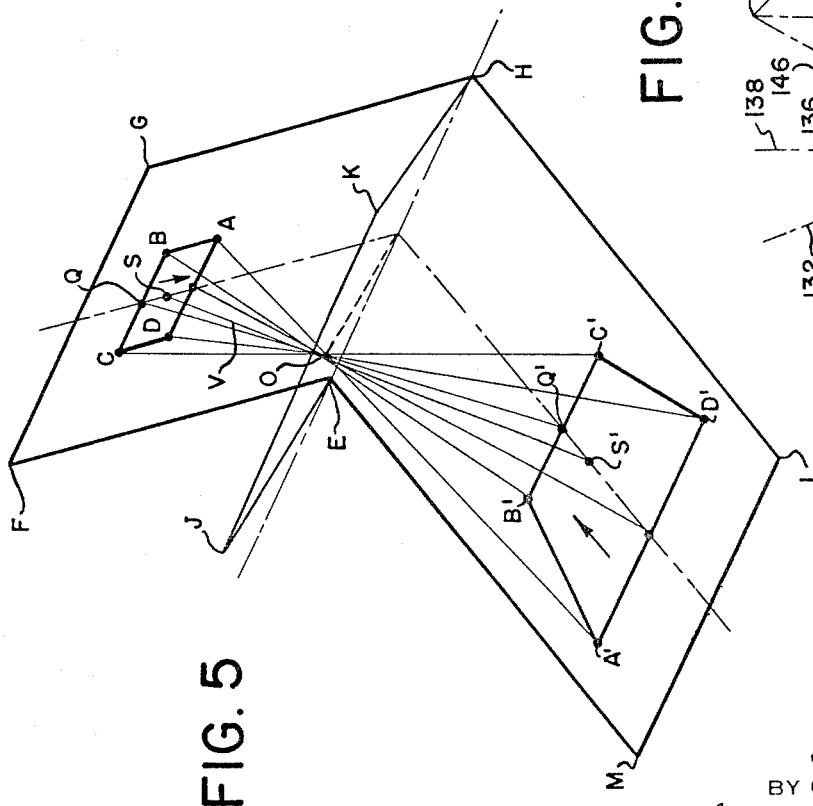

IMAGE-FORMING APPARATUS

IMAGE-FORMING APPARATUS

The present invention relates to optical apparatus for controllably presenting to an observer a variable field of view, usually of distant objects. The invention finds use, although not exclusive use, in flight simulator apparatus.

In accordance with the invention, one or more continuous strip films representative of terrain to be flown over are supported in position to be illuminated, and an image of a selected portion of the film is projected on a diffusing screen whose surface thus illuminated constitutes the object observed by means of an infinity sight. Provision is made to shift the film with respect to the lenses which produce the image just referred to so that the terrain observed through the sight may be changed. The motions imposed on the film may be interpreted by the observer as advance of the aircraft over the ground and as change in aircraft heading. Additional means are provided to effect motion of the image over the screen to give to the observer the illusion of roll and of pitch of the aircraft. These motions, produced by suitable motors, may be developed by servo and computer apparatus in response to operation by the observer of simulated flight control elements imitating those of an aircraft.

In accordance with one feature of the invention, the film employed is a so-called continuous strip film, instead of a succession of frames, and there is exhibited on the screen and hence to the observer an image of a region of terrain much larger than that embraced by the taking lens of the camera from which the strip film was produced. To give to the observer the illusion of perspective which would be present in such a large region of terrain as observed in one field of view by the human eye (with or without visual optical instruments), there is introduced into the image, as presented on the screen to form an object for the infinity sight, a perspective-simulating distortion and also a horizon, which suitably recedes as the film is advanced to represent aircraft movement.

The invention will now be further described with reference to the accompanying drawings wherein:

FIG. 2 is an optical diagram of the apparatus of FIG. 1 taken on the section line 2—2 in FIG. 3;

FIG. 4 is a sectional view on the line 4—4 in FIG. 1;

FIG. 5 is a diagram useful in explaining certain features of the invention;

FIG. 6 is a diagram illustrating an alternative construction for introducing perspective-simulating distortion into the system of FIGS. 1 to 3; and FIG. 7 is a diagram illustrating a further alternative construction for introducing such perspective-simulating distortion.

Figure 3:
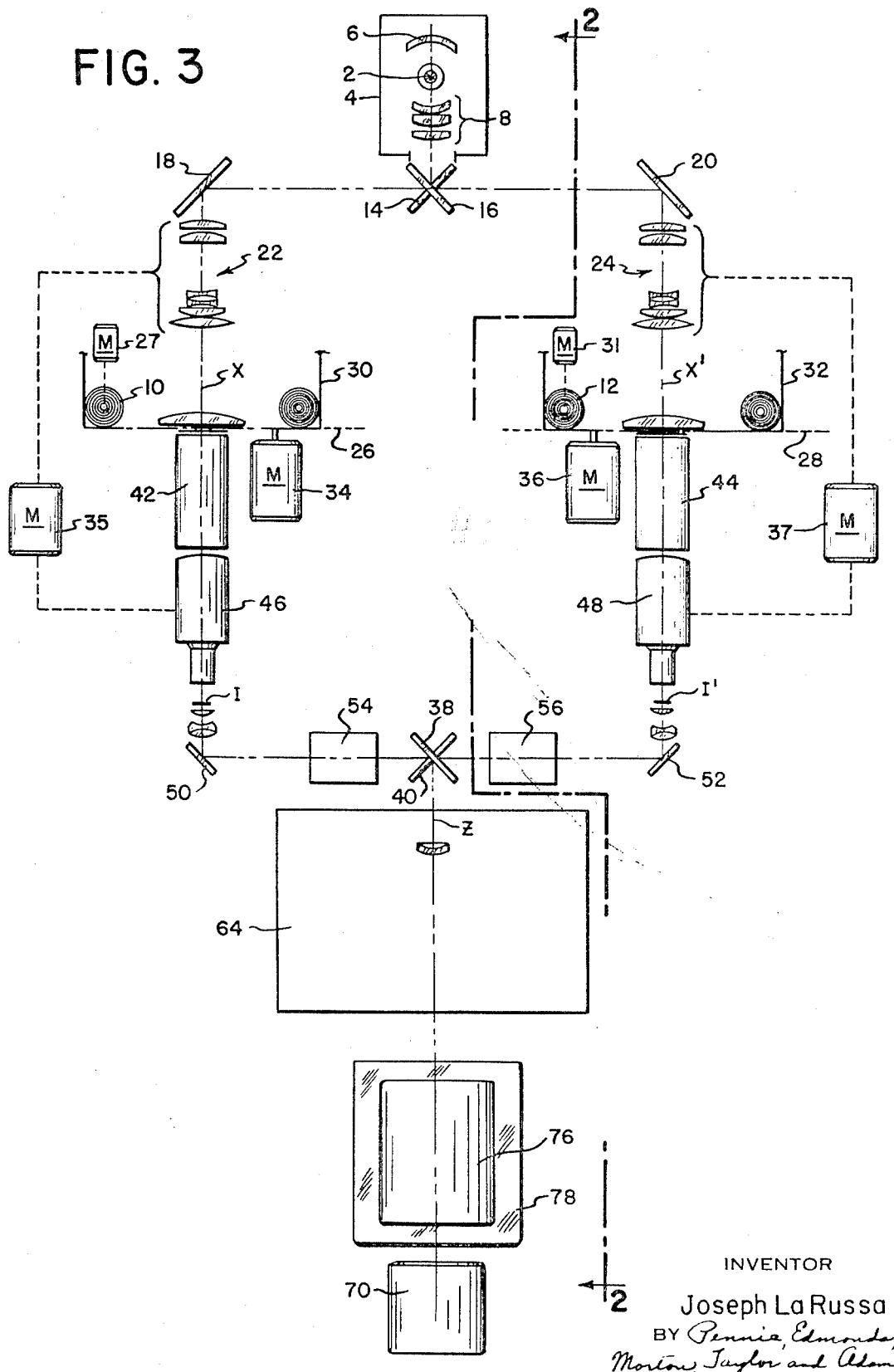
FIG. 3 is a view in elevation looking in the direction of the arrow II in FIG. 2.

Referring first to FIGS. 2 and 3, a light source such as a lamp 2 is disposed in a suitable enclosure 4 between a reflector 6 and a condenser lens system 8. Light from the source passing through the condenser is directed toward one or the other of two film strips 10 and 12 by means of a pair of "cross-dissolve" mirrors 14 and 16. These are plane mirrors disposed at 90° to each other, provided to permit deviation of the axis of condenser 8 either to the left or right. Mechanism not shown is provided for shifting the mirrors 14 and 16 as a unit in the plane of FIG. 2 and consequently across the plane of FIG. 3 so as to cause the beam of light from the source 2 to be intercepted by either one of the mirrors 14 or 16.

Relay mirrors 18 and 20 next lead to separate illumination varifocal lens assemblies 22 and 24. The varifocal lenses 22 and 24 focus on film planes 26 and 28, respectively, images at variable magnification of the source 2. Separate film cassettes diagrammatically indicated at 30 and 32 hold the films 10 and 12 in the film planes 26 and 28.

In the preferred form of the invention two film-holding devices are provided so as to extend further the range of scales at which the terrain to be flown over in the simulator may be presented to the observer, and thus to extend the range of apparent altitudes perceived by him. The two films are representations of the same terrain (actual or simulated), but at different scales, and the drives on the films and on the cassettes are so coupled together that in both cassettes the same topographical feature of terrain is always on the optical axis, shown at X for cassette 30 and at X' for cassette 32. Moreover, the orientations of the films are the same.

For introduction of the perspective-simulating distortion already referred to, the film planes 26 and 28 are inclined to their associated optical axes at a small angle $\alpha$ which may be from 5° to 7° for example. This inclination is shown, much exaggerated, in FIG. 2 where the film planes 26 and 28 appear in coincidence.

Cassette 30 is provided with a motor 27 for film advance (a translation of the film in its own plane and parallel to its own length), a motor 29 (FIG. 2) for lateral film shift (a translation of the cassette and thereby of the film in its own plane and crosswise of its own length), and a motor 34 (FIG. 3) for film rotation about an axis perpendicular to the film plane and eccentric to the optical axis X associated with that cassette. Cassette 32 is provided with corresponding motors 31, 33 and 36.

By means of suitably proportioned speeds imparted to the translation motors 27 and 29 or 31 and 33 (depending on which film is selected at the mirrors 14 and 16 to be illuminated), the image presented to the observer may be caused to shift at any desired speed and in any direction. There is thereby given to the observer the illusion of advance of an aircraft, in which he appears to himself to be sitting, over the ground. By means of the similarly selected motor 34 or 36, the image presented to the observer appears to rotate above a point which the observer interprets as the nadir point beneath his aircraft (or space vehicle), so that there is given to him the illusion of a change in azimuth for his vehicle.

Beyond the cassettes are provided collimation lens assemblies 42 and 44 followed by second varifocal lens assemblies 46 and 48. Lens assemblies 22 and 46 are coupled together and to an altitude variation motor 35, and lens assemblies 24 and 48 are similarly coupled together and to another altitude variation motor 37.

With the help of a number of reflecting and refracting elements presently to be described, the varifocal (i.e. "zoom") lenses 46 and 48 produce, at variable magnification, images of the illuminated portion of their respective films on a diffusing screen 64 (FIG. 2) which constitutes the object viewed at infinity by an infinity sight generally indicated at 100 (FIG. 1) of which the first part of the objective lens is seen at 102 in FIG. 2. This infinity sight may advantageously be of the type described in the application of Martin Shenker et al., Ser. No. 218,413, filed Aug. 21, 1962, now U.S. Pat. No. 3,432,219 and which is assigned to the assignee hereof.

The image of the selected portion of the film plane is translated over this screen 64 by operation of the translation motors 27 and 29 or 31 and 33, and it is rotated thereon by the motor 34 or 36.

The varifocal lenses 46 and 48 produce real aerial images of the films at image positions I and I' in FIG. 3. These appear superposed on each other in FIG. 2, where, it will be noted, the planes in which these images are formed are inclined to their respective optical axes, the axes X and X' being however indistinguishable from each other in the view of FIG. 2.

Downstream of the lenses 46 and 48 and of their image positions I and I' (in the sense of light flow from source 2 to screen 64), plane mirrors 50 and 52 restore the axes X and X' to collinearity. Relay lens assemblies 54 and 56 lead to a second pair of cross-dissolve mirrors 38 and 40, beyond which the system exhibits a single optical axis Z.

The motion of mirrors 38 and 40 is coupled to that of mirrors 14 and 16, so that if the light from the source 2 is deviated by mirror 14 to cassette 30, the light will be deviation by mirror 28 along axis Z. That is, either mirrors 14 and 38 are selected, or mirrors 16 and 40 are selected. Electrical means may be provided to shift these mirrors. To simulate climb from a low to a high altitude, operation of the system begins by selection at the cross-dissolve mirrors of the cassette, cassette 30, say, having in it the film containing a large scale representation of the terrain, and by setting of its associated varifocal lenses 22 and 46 to produce on the screen 64 an image of maximum magnification. Climb will then be represented by reduction in the magnification so introduced by those varifocal lenses, and at the end of the range of their adjustment the cross-dissolve mirrors may be shifted to illuminate instead the film 12 of smaller scale in cassette 32, with varifocal lenses 24 and 48 producing maximum magnification of that film on screen 64.

The image on screen 64 is formed, as regards refractive lens action, by a projection lens 66 which is made optically coaxial with the refractive elements upstream thereof by means of a plane mirror 60. The mirror 60 is employed to introduce a horizon into the image presented to the observer, in a manner presently to be described, and there may be associated with it a sky projector 62.

Beyond the projection lens 66 the optical axis is deviated by a plane mirror 68. The mirror 68, and a succession of mirrors 70, 72, 76 and 78 are mounted together on a carriage diagrammatically indicated at 67 for rotation under influence of a motor 69 around the optical axis Y of the infinity sight 100. Rotation of the image formed on screen 64 by rotation of the carriage 67 about the sight axis Y produces for the observer the illusion of roll of the simulated aircraft about its longitudinal axis.

The mirrors 68, 70, 72, 76 and 78 deflect the optical axis Y over a path including five straight line segments which define a plane, and the mirror 78 is movably mounted on carriage 67 for translation with respect to that carriage under influence of a motor 80 along a reversible line of motion lying in this plane. The effect of motion of the mirror 78 is to shift the image on screen 64 "up" or "down" in directions parallel to the plane defined by the optical axis of the projection lens as defined by mirrors 68, 70, 72, 76 and 78. Mirrors 70 and 72 are also movably mounted on carriage 67 and are driven, as by a motor 82, so as to maintain a constant optical path length along the optical axis from mirror 68 to the intersection of that axis with screen 64. In this way, the image on screen 64 is held in focus.

On the observer seated at 105 (FIG. 1) and looking into the concave mirror eyepiece 107 of the infinity sight, the effect produced by motion of mirror 78 is the impression of a change in pitch for his vehicle, i.e. of a rotation of his vehicle about its transverse axis.

The films 10 and 12 are continuous strip films, which may be produced for example by combining a number of laterally overlapping continuous strip pictures each produced by superposition of a succession of rectified forward oblique photographs of the terrain taken from an aircraft, with a large amount of longitudinal overlap. It is desirable however, in accordance with the invention, to provide to the observer a large field of view. This field of view may for example be 50° in vertical extent and 100° in horizontal extent. Such a vertical field of view is indicated at the exit pupil 108 of the infinity sight in FIG. 1 by the angles of 20° above and 30° below the horizontal there shown in conjunction with the eyepiece mirror 106. The horizontal field of 100° is shown in FIG. 4.

There is consequently to be presented to the observer a field of view in which, in the real world, perspective would be strongly noticeable. In addition, it is desirable to present to him a horizon, with a portion of sky above it within the vertical field of view, although the continuous strip films include no horizon and also include relatively little perspective. Hence perspective-simulating distortion is introduced into the image formed on screen 64. This is done in accordance with the so-called Scheimpflug condition, described for example in U.S. Pat. No. 751,347. In accordance with this method, at some point in the system between the film in the cassettes and the final image screen 64, a lens (or lens combination) which serves to produce a real image of the object presented to it (whether that object is the film or a real image of that film) is so combined with that object and with the plane in which that lens forms an image of that object that the object plane, the plane perpendicular to the lens axis and containing the optical center of the lens, and the image plane all intersect each other substantially in a common straight line lying in all three planes. The result is that for a rectangular object having two sides parallel to the common line of intersection just referred to, the image will have the shape of a trapezoid.

The distortion of the object represented by the instantaneously illuminated portion of the film which is introduced in accordance with the invention into the image of that film ultimately presented on the diffusing screen 64 may be understood by reference to FIG. 5. In that figure a rectangular plane object A, B, C, D is shown lying in an object plane E, F, G, H. A lens having its optical center at O is positioned so that the plane E. J, K, H perpendicular to the axis V of the lens and containing the point O is inclined to the object plane E, F, G, H, in practice at a small angle. The lens plane E, J, K, H intersects the object plane E, F, G, H along the line EH. The object has been chosen with its sides AD and CB parallel to the line EH. The lens forms an image A', B', C', D' the object A, B, C, D in an image plane which intersects the object and lens planes in or substantially in the line EH, the image plane being inclined to both the object and lens planes and being indicated at L, M, E, H. The image A', B', C', D' of the rectangular object is seen to be trapezoidal in shape with the short parallel side adjacent the intersection line EH. In the trapezoidal image the scale is accordingly compressed "vertically," i.e. along lines parallel to the trace in the image plane of the plane containing the lens axis which is perpendicular to line EH, from a maximum value at the side A'D' of the image to a minimum at the side B'C'. Thus the image S' of an object point S at the geometrical center of the object A, B, C, D is closer to the short side B'C' of the image than to the long side A'D'. The scale also varies "horizontally," from a minimum in the middle of the image to a maximum at the slant sides thereof.

The angular separation of the planes E, F, G, H; E, J, K, H and E, H, L, M has been greatly exaggerated in FIG. 5 for clarity of the drawing.

In the embodiment of the invention illustrated in FIGS. 1 to 4, this type of distortion is introduced into the image produced on screen 64 by inclining to each other in the manner illustrated in FIG. 5 (but with due account for folding of the optical path at mirrors 68, 70, 72, 76 and 78) the planes I and I' of the film images, the plane perpendicular to the axis of projector 66 and passing through its optical center, and the plane of screen 64.

Plane E, F, G, H of FIG. 5 thus corresponds to the plane of the image I or I' of FIG. 2. Plane E, J, K, H of FIG. 5 corresponds to the plane perpendicular to the axis of lens 66 of FIG. 2 and passing through the optical center of that lens, and plane E, H, L, M of FIG. 5 corresponds to the plane of screen 64 in FIG. 5.

The uniform or nearly uniform scale of inches on the film to miles on the terrain which characterizes the continuous strip films 10 and 12 is accordingly changed, in the image presented on screen 64, into a scale which varies from a maximum at the "bottom" to a minimum at the "top" of that image, and which at any height in the image from "bottom" to "top" thereof varies from a minimum in the middle to a maximum at either lateral edge. By "bottom" is meant the part of the image nearest the mirrors 70, 72, 76 and 78.

This type of distortion introduced into the image on the screen 64 provides to the observer an illusion of perspective which for many training purposes is a satisfactory representation to him of the large area of terrain encompassed within the part of the film imaged on the screen.

Instead of presenting to the observer simply an image in which the topographic features are more and more compressed together with increasing apparent distance thereof up to an arbitrary limit set by film area imaged at I or I' (FIG. 2), it is advantageous to apply to the image a horizon above which there may be presented a representation of the sky. The horizon is effectively inserted by the lower edge of the mirror 60, as it appears in FIG. 2—either the physical edge of the mirror, or the lower limit of specular reflectivity therefor. The transition from full reflection to substantially no reflection can be made a gradual one, to give to the observer the impression of a region or layer of haze at the horizon. A sky projector 62 may also be provided to fill in, with an appropriate color representative of the sky, the region on the screen 64 above the horizon and/or haze.

The output of the sky projector may be simply color, or it may have content such as cloud formations, as for example from a continuous strip film. This output may be applied to the screen 64 through the projection lens 66, thereby partaking of Scheimpflug distortion (if that output includes anything more than color) or it may be bypassed around the projection lens.

In terms of FIG. 5, the horizon may be considered as a limitation along CB of the light transmitted to the projection lens (considered as having its optical center at O) from the image at I or I' (FIG. 2). The point of vanishing perspective is taken to be the intersection of the horizon line with the trace, in the image plane E, H, L, M of the plane which contains the optical axis V of the lens employed for Scheimpflug distortion (the projection lens 66 of FIG. 2, in the case under consideration) and which is perpendicular to the intersection line EH of the object plane E, F, G, H, lens plane E, J, K, H and image plane E, H, L, M. In FIG. 5 therefore the point of vanishing perspective in the image is the point Q', which is an image of the point Q in the object A, B, C, D presented to the lens.

Since to the observer the longitudinal axis of the aircraft is identified with the axis of the infinity sight, indicated at Y in FIG. 2, the flight control elements (e.g. pilot's control stick of an airplane, etc.) of the simulator are desirably so coupled to the drive motor 80 on mirror 78 that when these control elements are in the position representative of level flight about the longitudinal aircraft axis, the image will be positioned by mirror 78 on screen 64 so that the point of vanishing perspective (Q' in FIG. 5) will lie on the screen at or near the place where the screen is intersected by the axis Y of the infinity sight. The optical axis Z of the system upstream of screen 64 will then intersect that screen below the axis Y.

These relationships are indicated in FIG. 2, where there is also indicated a region of light haze extending equally above and below the horizon. The image on the screen (considering the colored sky from projector 62 as part of that image) is of such vertical extent as to fill the desired vertical angular field of view for the observer looking into the infinity sight 100 when the image is positioned with the point of vanishing perspective on the sight axis Y and also when the image is shifted up or down by mirror 78 to simulate, respectively, pitch down or pitch up of the longitudinal aircraft axis. By way of example only, the vertical extent of the image on screen 64 appropriate to the 50° vertical field of view assumed for sight 100, and allowing for simulated pitch up and pitch down aircraft angles of 20°, has been shown in FIG. 2. The image is indicated as being positioned on the screen for the level flight condition, with the perspective vanishing point Q' on the horizon at the midheight of a haze region disposed on the axis Y of sight 100. The image S' of the optical axis Z is also shown beneath Q'.

The embodiment of the invention illustrated in FIGS. 1 to 4 includes a semitransparent plane mirror 104 disposed obliquely across the axis Y of the sight 100 between the objective of that sight, whose first element is shown at 102 in FIG. 2, and the screen 64. This plane mirror permits presentation to the observer of additional information, as by means of a cathode ray tube 106, in front of which may be disposed a field correction lens 108. The cathode ray input may for example by used to present to the observer one or more moving targets in his field of view. It is not however a necessary element of the invention.

Figure 1:
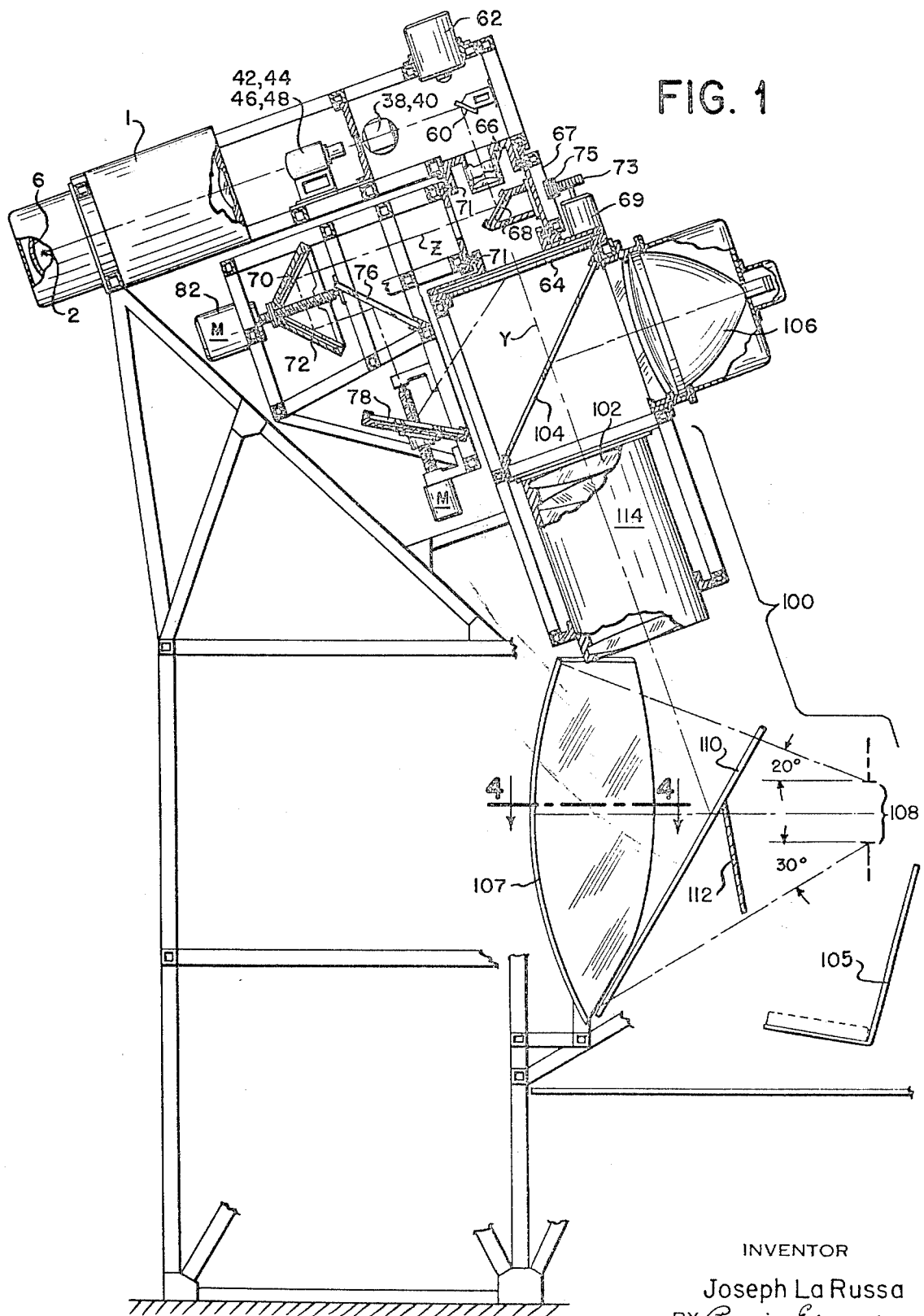
FIG. 1 is a schematic diagram of one form of apparatus according to the invention.

FIG. 1 shows in schematic form a physical realization of the system of the invention described in conjunction with FIGS. 1 and 2. In FIG. 1 the observer's position is indicated at 105. The observer looks through a semitransparent plane mirror 110, optionally over a simulated instrument panel 112, into a concave mirror 107 which together with mirror 110 and an objective indicated at 114 constitutes an infinity sight, advantageously of the type disclosed in the Shenker et al. application above mentioned. Alternatively the infinity sight may be regarded as made up of the concave mirror 107 and mirror 110, the objective 114 constituting means to translate to the focal plane of the infinity sight an image of the screen 64.

The carriage 67 is supported in bearings 71 for rotation about a mechanical axis coincident with the axis Y of the sight 100, and more particularly of the objective 114 thereof. The motor 69 drives the carriage 67 by engagement of its pinion 73 with a gear sector 75 affixed to the carriage coaxially with the mechanical axis of rotation just mentioned. The mirrors 70 and 72 are mounted for motion by their motor 82 with respect to carriage 67 through the operation of a lead screw, and a similar device is shown for the mirror 78. The light source, condenser first cross-dissolve mirrors 14, 16 and other elements to and including the film cassettes and their associated motors are in the structure of FIG. 1 shown enclosed within a housing 1. The other optical elements described in connection with FIGS. 2 and 3 are clearly seen in FIG. 1. The exit pupil of the infinity sight is indicated at 108 in FIG. 1, and it is here that are realized the angular fields of view which have been described.

The perspective-simulating distortion described in conjunction with FIG. 5 may be introduced into the image presented on the diffusing screen to the infinity sight in other ways besides that which has been described in conjunction with FIGS. 2 and 3, where a suitable relative inclination of the planes of the films 10 and 12 (and thereby of the images I and I' of those films), of the plane of screen 64, and of the plane through the optical center of lens 66 and perpendicular to the axis of that lens has been employed for the purpose.

One such alternative arrangement is shown diagrammatically in FIG. 6. There the film itself, indicated at 10, and an objective-type lens 120 are oriented with a desired inclination between the plane of the film and the plane 22 which is perpendicular to the axis of lens 120 and passes through the optical center thereof. The film is illuminated over a desired area by a condensing optical system indicated diagrammatically at 124. The result is the formation of a real but distorted aerial image 126 in a plane 128, inclined to the plane 122 and also to that of the film. The image 126 then serves as object to a lens 130, whose axis is perpendicular to that plane 128, the lens 130 being for example the varifocal magnifier 46 or 48 of FIG. 3. The arrangement of FIG. 6 will be duplicated for the other film strip, if two are provided.

Still another mode of introducing the perspective-simulating distortion desired is shown diagrammatically in FIG. 7. In that FIG. the object plane, shown at 132, contains an object 134 into an image of which it is desired to introduce perspective-simulating distortion in accordance with the Scheimpflug principle. A first lens 136 is disposed with its optical center in and its axis perpendicular to a plane 138 which is inclined to the object plane 132 and which intersects it along a line which is perpendicular to the plane of the figure, as are the planes 132 and 138. This line is indicated in FIG. 7 by the point 135. The lens 136 produces a distorted image indicated at 140 in a third plane 142 which is also perpendicular to the plane of the figure and which intersects both of the planes 132 and 138 along or substantially along their line of intersection 135. Additional distortion is introduced by a second application of the Scheimpflug principle. To this end a second lens 145 is disposed with its optical center in and its axis perpendicular to a plane 144 which is perpendicular to the plane of the figure and which is oblique to image plane 142, intersecting plane 142 along a line parallel to line 135 and indicated in FIG. 7 at 143, the line of intersection 143 being on the side of image 140 opposite to the line of intersection 135. A field lens 146 may be positioned at or near the location of image 140 in order to increase the quantity of light passing from image 140 through the lens 145. Lens 145 focuses an image of the image 140 at a location 148 in a plane 150, perpendicular to the plane of the figure and intersecting the planes 142 and 144 at or near their intersection 143.

The invention thus provides image-forming apparatus comprising means such as either of cassettes 30 and 32 to support an object in a first substantially plane position. The apparatus also comprises lens means such as lens assembly 46 or 48 and associated relay 54 or 56 and mirror 38 or 40 having an optical axis to form in a second substantially plane position I or I' an image of the object at variable magnification. Projection lens 66 optically coaxial with the lens means 46, etc. forms an image of the image at I or I' in a third substantially plane location, namely that of screen 64, which is oblique to the optical axis of the projection lens as incident on that third location. The apparatus also includes a plurality of plane reflecting means 68, 70, 72, 76 and 78 positioned to deviate the optical axis of the projection lens on the side thereof optically remote from the first lens means 46.

One of the image-forming means, i.e. either that producing the first image at I or I' or that producing the image on the screen 64, is disposed with respect to its object to introduce perspective-simulating distortion into its image. Thus, this lens has its center in and its axis perpendicular to a plane which, due account being had for deviations of the optical path, is oblique to the plane in which the object for that lens is disposed.

Further according to a desirable feature of the invention, at least two of the plane reflecting means between the projection lens and screen 64 are separately movable each parallel to its own reflecting surface so as to maintain constant the optical path length between the projection lens and screen 64 while causing the axis of the projection lens, as deviated by those plane reflecting means, to move over the surface of the screen 64, which that axis so deviated intersects obliquely. In the example illustrated, the plane mirrors 70, 72 and 78 are thus movable to perform this function.

The apparatus of the invention further preferably includes in a form such as that of the motors 27 and 29, means to impose independent translation motions on the object disposed in the object position constituted by the film plane 26 or the film plane 28. It additionally preferably includes means such as that exemplified by the motor 34 or the motor 36 to rotate an object in the film plane within the film plane about an axis eccentric to the optical axis of the corresponding one of the lenses 46 and 48 as that axis intersects the film plane. Moreover, the invention desirably includes apparatus such as the infinity sight 100 to form at infinity an image of the diffusing screen on which the projection lens 66 focuses an image, and it preferably includes means such as the carriage 67 to rotate the movable plane reflecting means such as those of mirrors 70, 72, 76 and 78 about the optical axis of that infinity sight.

I claim:

1. Image-forming apparatus comprising means to support an object in a first substantially plane position, lens means having an optical axis to form in a second substantially plane position an image of said object at variable magnification, projection lens means optically coaxial with said first-named lens means to form an image of said first-named image at a third substantially plane location oblique to the optical axis of said projection lens means, a plurality of plane reflecting means positioned to deviate the optical axis of said projection lens means on the side thereof optically remote from said first-named lens means, means to impose independent translational motions in the plane of said first position on an object in said first position, and means to rotate an object in said first position within the plane of said first position about an axis eccentric of the optical axis of said first lens means as produced to said first position.

2. Image-forming apparatus comprising means to support an object in a first substantially plane position, lens means having an optical axis to form in a second substantially plane position an image of said object at variable magnification, projection lens means optically coaxial with said first-named lens means to form an image of said first-named image at a third substantially plane location oblique to the optical axis of said projection lens means, a plurality of plane reflecting means positioned to deviate the optical axis of said projection lens means on the side thereof optically remote from said first-named lens means, a diffusing screen disposed adjacent said third location as defined by said projection lens means in conjunction with said plane reflecting means, sight means to form at infinity an image of said diffusing screen, and means to rotate said plane reflecting means about the optical axis of said sight means.

3. Image-forming apparatus comprising means to support an object in a first plane, lens means having an optical axis and an optical center, said optical axis being optically nonperpendicular to said plane, image-receiving means located in a plane optically intersecting said first plane substantially at the optical intersection with said first plane of the plane passing through the optical center of said lens means and perpendicular to said optical axis, sight means having a focal plane to form at infinity an image of an object in said focal plane, and means to translate to said focal plane an image of said image receiving means.

4. Image-forming apparatus according to claim 3 wherein said lens means includes a first lens positioned to form at variable magnification an intermediate image of said object and a projection lens positioned to form an image of said intermediate image on said image-receiving means.

5. Image-forming apparatus according to claim 3 including a plurality of plane reflecting means positioned to deviate the optical axis of said projection lens on the side thereof optically remote from said first lens, and separate means to move at least two of said plane reflecting means parallel to the optical axis of said projection lens as optically incident thereon respectively.

6. Image-forming apparatus according to claim 3 including separate means to translate an object in two directions in said first plane.

7. Image-forming apparatus according to claim 3 including in said first plane a continuous strip film record of a succession of rectified forward oblique topographical photographs.

PO-1050
(5/69)

UNITED STATES PATENT OFFICE
CERTIFICATE OF CORRECTION

Patent No. 3,580,660　　　　　　　　Dated May 25, 1971

Inventor(s) Joseph La Russa

It is certified that error appears in the above-identified patent and that said Letters Patent are hereby corrected as shown below:

```
Column 2, line 75, for "deviation" substitute --deviated--.
Column 3, line 1, for "28" substitute --38--.
Column 4, line 25, insert --of-- before "the".
Column 5, line 72, for "by" substitute --be--.
Column 6, line 43, for "22" substitute --122--.
```

Signed and sealed this 26th day of October 1971.

(SEAL)
Attest:

EDWARD M. FLETCHER, JR.　　　　　ROBERT GOTTSCHALK
Attesting Officer　　　　　　　　Acting Commissioner of Patents